United States Patent
Shen et al.

(10) Patent No.: US 9,143,180 B2
(45) Date of Patent: Sep. 22, 2015

(54) CELL PHONE CHARGER HOLDER

(71) Applicants: Cheng-Hsien Shen, Tainan (TW);
Meng-Ju Shen, Tainan (TW)

(72) Inventors: Cheng-Hsien Shen, Tainan (TW);
Meng-Ju Shen, Tainan (TW)

( * ) Notice: Subject to any disclaimer, the term of this patent is extended or adjusted under 35 U.S.C. 154(b) by 94 days.

(21) Appl. No.: 14/141,527

(22) Filed: Dec. 27, 2013

(65) Prior Publication Data
US 2015/0188591 A1 Jul. 2, 2015

(51) Int. Cl.
*H04B 1/38* (2015.01)
*H04M 1/00* (2006.01)
*H04B 1/3883* (2015.01)
*H04M 1/02* (2006.01)

(52) U.S. Cl.
CPC ........... *H04B 1/3883* (2013.01); *H04M 1/0274* (2013.01)

(58) Field of Classification Search
None
See application file for complete search history.

(56) References Cited

U.S. PATENT DOCUMENTS

| | | | |
|---|---|---|---|
| 2003/0218445 A1* | 11/2003 | Behar | 320/114 |
| 2009/0121680 A1* | 5/2009 | Kikuchi | 320/115 |
| 2011/0187323 A1* | 8/2011 | Gourley | 320/111 |
| 2013/0187606 A1* | 7/2013 | Ting | 320/114 |
| 2015/0015204 A1* | 1/2015 | Sorias et al. | 320/111 |
| 2015/0018049 A1* | 1/2015 | Baschnagel | 455/573 |

* cited by examiner

*Primary Examiner* — Erika A Washington
(74) *Attorney, Agent, or Firm* — Alan D. Kamrath; Kamrath IP Lawfirm, P.A.

(57) ABSTRACT

A cell phone charger holder includes a main body, a plug, and an electric cord. The plug has two blades. The main body has a front face provided with a receiving chamber for receiving the plug. The main body has a side provided with an annular groove for winding the electric cord. The main body has a lower portion provided with two positioning hooks for placing a cell phone. The main body has a back face provided with two upright slots corresponding to the blades of the plug. Thus, the plug and the electric cord are positioned and stored completely by the main body. In addition, when the main body is disposed at an inclined state, the cell phone supported by the main body is disposed at an inclined state.

6 Claims, 11 Drawing Sheets

CELL PHONE CHARGER HOLDER

BACKGROUND OF THE INVENTION

1. Field of the Invention

The present invention relates to a holder and, more particularly, to a holder for a cell phone charger.

2. Description of the Related Art

A conventional charger for a cell phone comprises a charger body, a plug and an electric cord. However, when the charger is carried outdoors, the plug is not positioned and stored easily. In addition, the electric cord is easily tangled, thereby causing inconvenience to the user when using the charger. A conventional charger reel (or box) can be used to wind and store the electric cord. However, the conventional charger reel has a larger volume, thereby causing inconvenience in packaging, storage and transportation of the charger reel, so that the user cannot carry the charger reel easily and conveniently. In addition, the plug cannot be stored completely, thereby limiting the versatility of the charger reel.

BRIEF SUMMARY OF THE INVENTION

The primary objective of the present invention is to provide a holder that can completely receive and store the plug and the electric cord of a charger easily and quickly.

In accordance with the present invention, there is provided a cell phone charger holder comprising a main body, a plug, and an electric cord. The plug is available for a charger of a cell phone and has two blades. The electric cord is available for the charger of the cell phone. The main body has a front face provided with a receiving chamber for receiving the plug. The main body has a side provided with an annular groove for winding the electric cord. The main body has a lower portion provided with two positioning hooks each protruding outward therefrom. Each of the positioning hooks of the main body is provided with a stop plate. The main body has a back face provided with two upright slots corresponding to the blades of the plug.

Preferably, the main body is formed integrally. The back face of the main body is provided with a plurality of arcuate clamping openings. The back face of the main body has an upper portion provided with a circular through hole and a lower portion provided with an elongate slot.

Preferably, the back face of the main body has four chamfered corners each provided with the respective arcuate clamping openings.

Preferably, the front face of the main body is provided with two slits for receiving the blades of the plug.

Preferably, the back face of the main body is provided with a receiving recess for receiving a bottom or a side of the plug so that the main body is inclined by support of the plug.

Alternatively, the plug has a bottom provided with a USB slot, and the back face of the main body is provided with a projection corresponding to the USB slot of the plug so that the main body is inclined by support of the plug.

According to the primary advantage of the present invention, the plug and the electric cord are positioned and stored completely by the main body of the holder so that the charger is stored easily and quickly to facilitate the user carrying and using the charger.

According to another advantage of the present invention, when the main body is disposed at an inclined state, the cell phone supported by the main body is disposed at an inclined state to facilitate the user operating the cell phone, such as watching video films or exploring the internet.

According to a further advantage of the present invention, the main body is supported by an ordinary item, such as a coin, an elongate article, a cylindrical object and the like, so that the main body is disposed at an inclined state easily and quickly, thereby facilitating the user inclining the cell phone.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
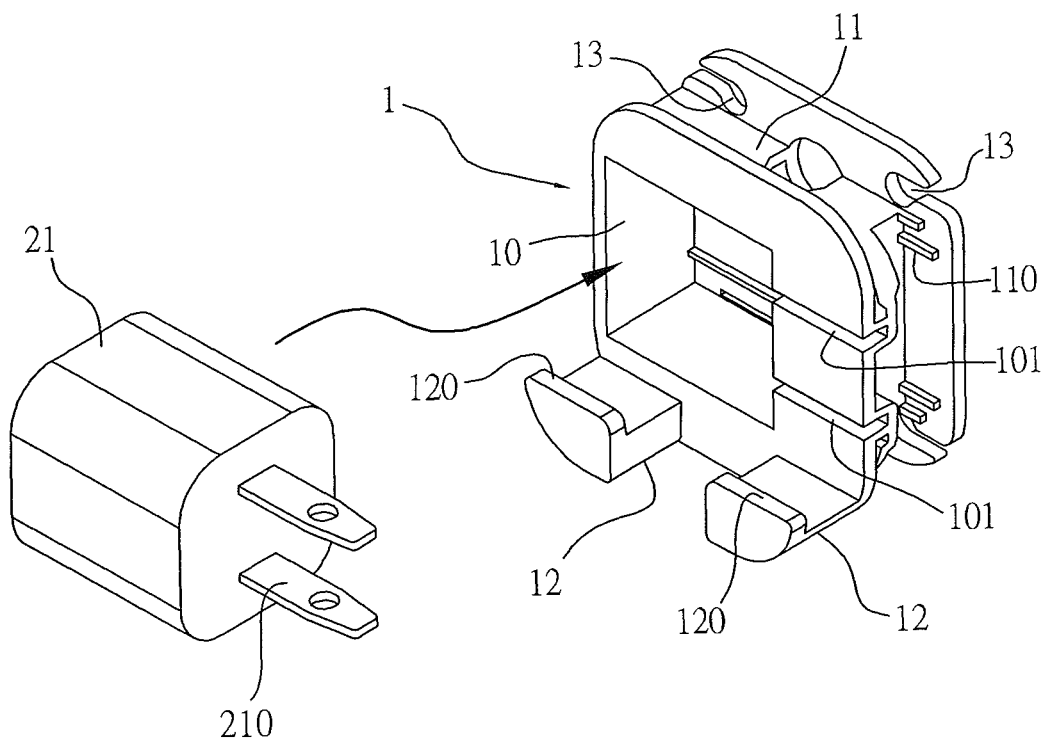
FIG. 1 is a partially exploded perspective view of a cell phone charger holder in accordance with the preferred embodiment of the present invention.

Referring to the drawings and initially to FIGS. 1-4, a cell phone charger holder in accordance with the preferred embodiment of the present invention comprises a main body 1, a plug 21, and an electric cord 22.

The plug 21 is available for a charger of a cell phone and has two blades 210.

The electric cord 22 is available for the charger of the cell phone and has a power supply connector 220 and a charger connector 221.

The main body 1 is formed integrally and has a front face provided with a receiving chamber 10 for receiving the plug 21. The front face of the main body 1 is provided with two slits 101 for receiving the blades 210 of the plug 21. Each of the slits 101 of the main body 1 is connected to the receiving chamber 10. The main body 1 has a side provided with an annular groove 11 for winding the electric cord 22. The annular groove 11 of the main body 1 is provided with an insertion channel 110 to allow insertion of the power supply connector 220 of the electric cord 22. The main body 1 has a lower portion provided with two positioning hooks 12 each protruding outward therefrom. Each of the positioning hooks 12 of the main body 1 has a front end provided with a stop plate 120. The main body 1 has a back face having a center provided with two upright slots 14 corresponding to the blades 210 of the plug 21. The back face of the main body 1 is provided with a plurality of arcuate clamping openings 13. Preferably, the back face of the main body 1 has four chamfered corners each provided with the respective arcuate clamping openings 13. The back face of the main body 1 has an upper portion provided with a circular through hole 15 and a lower portion provided with an elongate slot 16.

Figure 2:
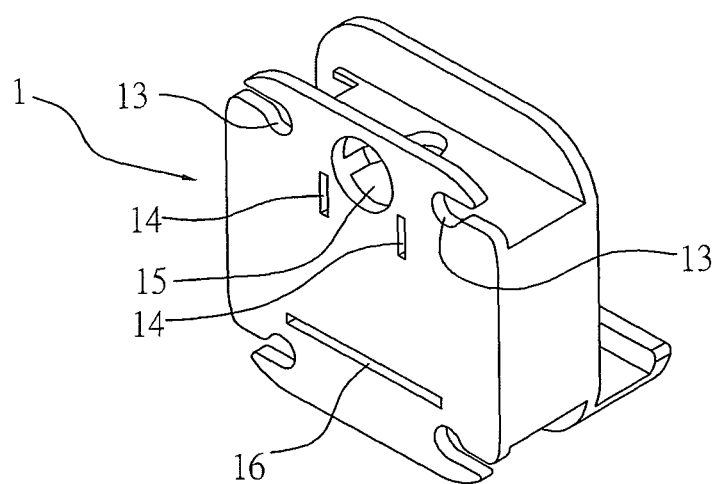
FIG. 2 is a perspective view of a main body of the cell phone charger holder as shown in FIG. 1.
Figure 3:
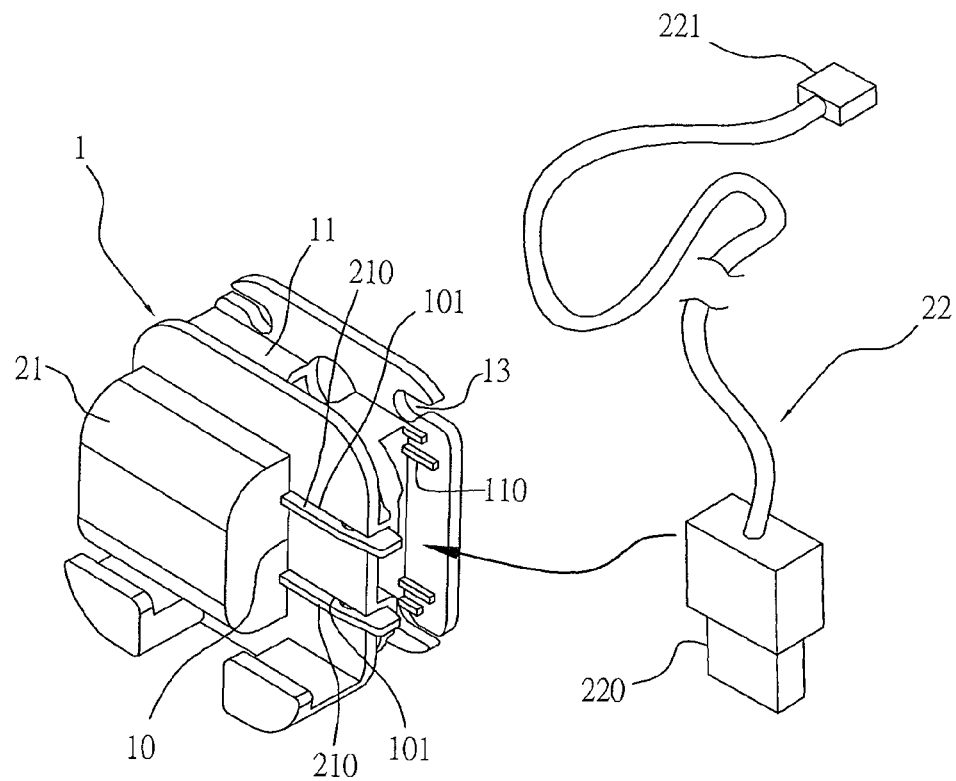
FIG. 3 is a partially exploded perspective view of the cell phone charger holder in accordance with the preferred embodiment of the present invention.
Figure 4:
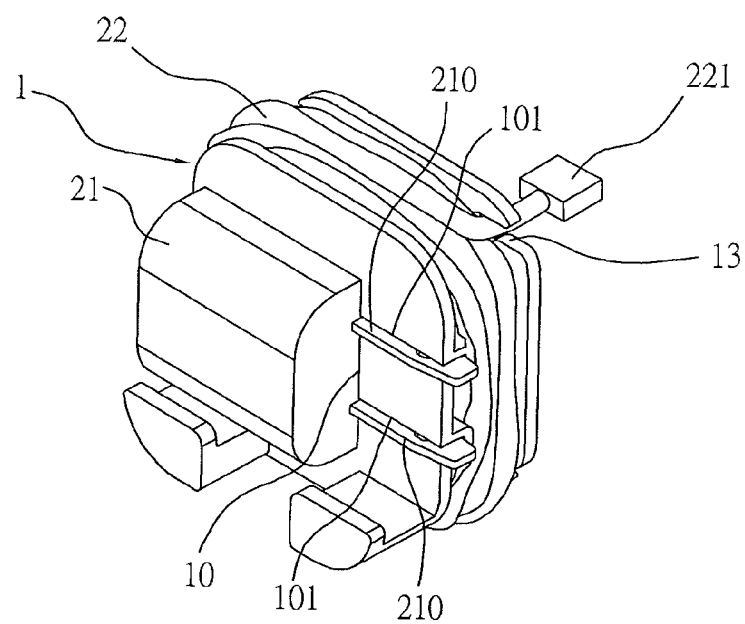
FIG. 4 is a perspective assembly view of the cell phone charger holder as shown in FIG. 3.

In storage of the holder, referring to FIGS. 3 and 4 with reference to FIGS. 1 and 2, the plug 21 is inserted into the receiving chamber 10 of the main body 1, and the blades 210 of the plug 21 are inserted into the slits 101 of the main body 1, so that the plug 21 is attached to the main body 1 and is positioned and stored completely as shown in FIG. 3. Then, the power supply connector 220 of the electric cord 22 is inserted into the insertion channel 110 of the annular groove 11 of the main body 1. Then, the electric cord 22 is wound around the main body 1 along the annular groove 11 of the main body 1. Finally, the charger connector 221 of the electric cord 22 is inserted through any one of the clamping openings 13 of the main body 1 so that the electric cord 22 is attached to the main body 1 and is positioned and stored completely. Thus, the holder is stored easily and quickly as shown in FIG. 4.

Figure 5:
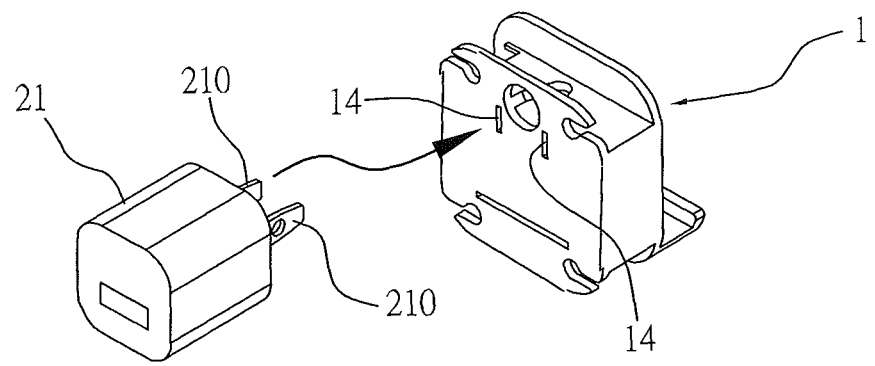
FIG. 5 is a partially exploded perspective view of the cell phone charger holder in accordance with the preferred embodiment of the present invention.
Figure 6:
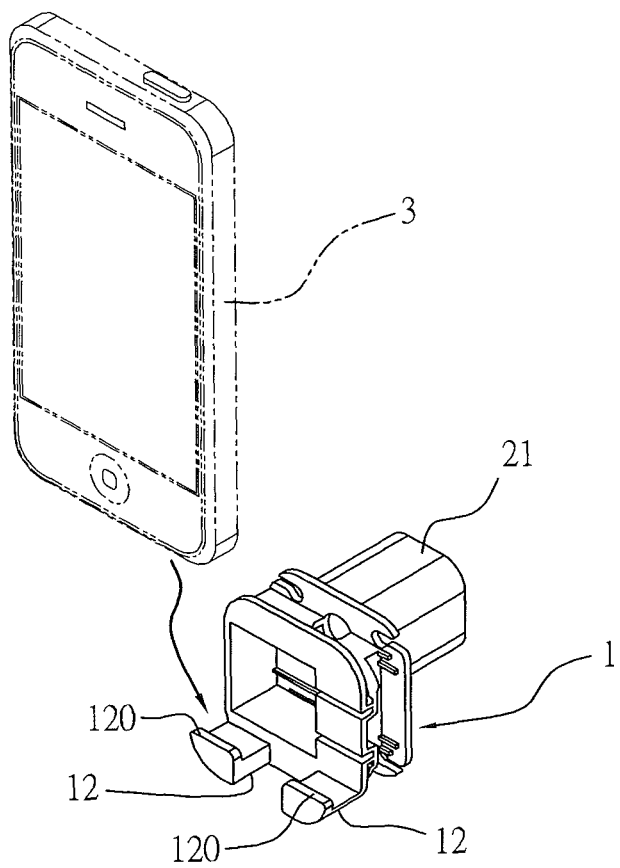
FIG. 6 is a perspective assembly operational view of the cell phone charger holder as shown in FIG. 5.
Figure 7:
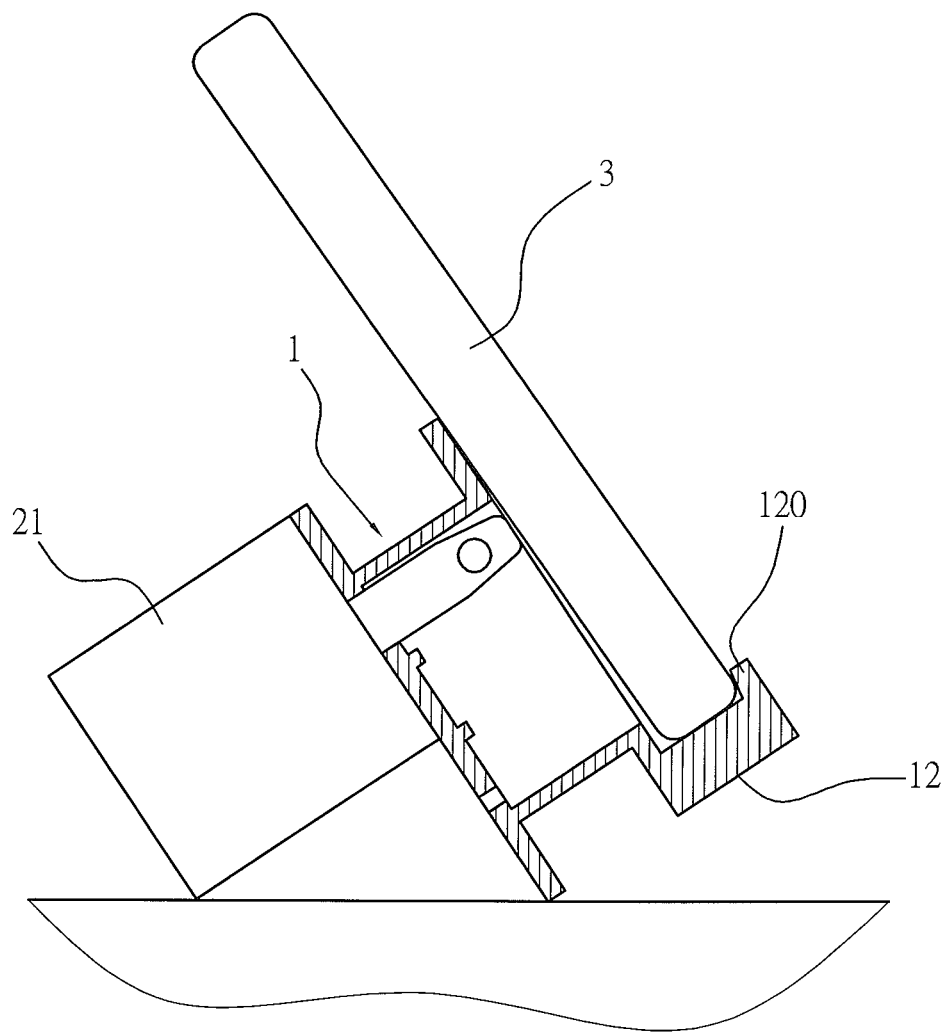
FIG. 7 is a side cross-sectional assembly operational view of the cell phone charger holder as shown in FIG. 6.

Referring to FIGS. 5-7, the blades 210 of the plug 21 are inserted into the upright slots 14 of the main body 1, so that the plug 21 is attached to the main body 1. Then, a cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the plug 21 is inclined to abut a surface (not labeled) so as to support the main body 1, so that the cell phone 3 is disposed at an inclined state to facilitate a user operating the cell phone 3, such as watching video films or pictures or exploring the internet.

Figure 8:
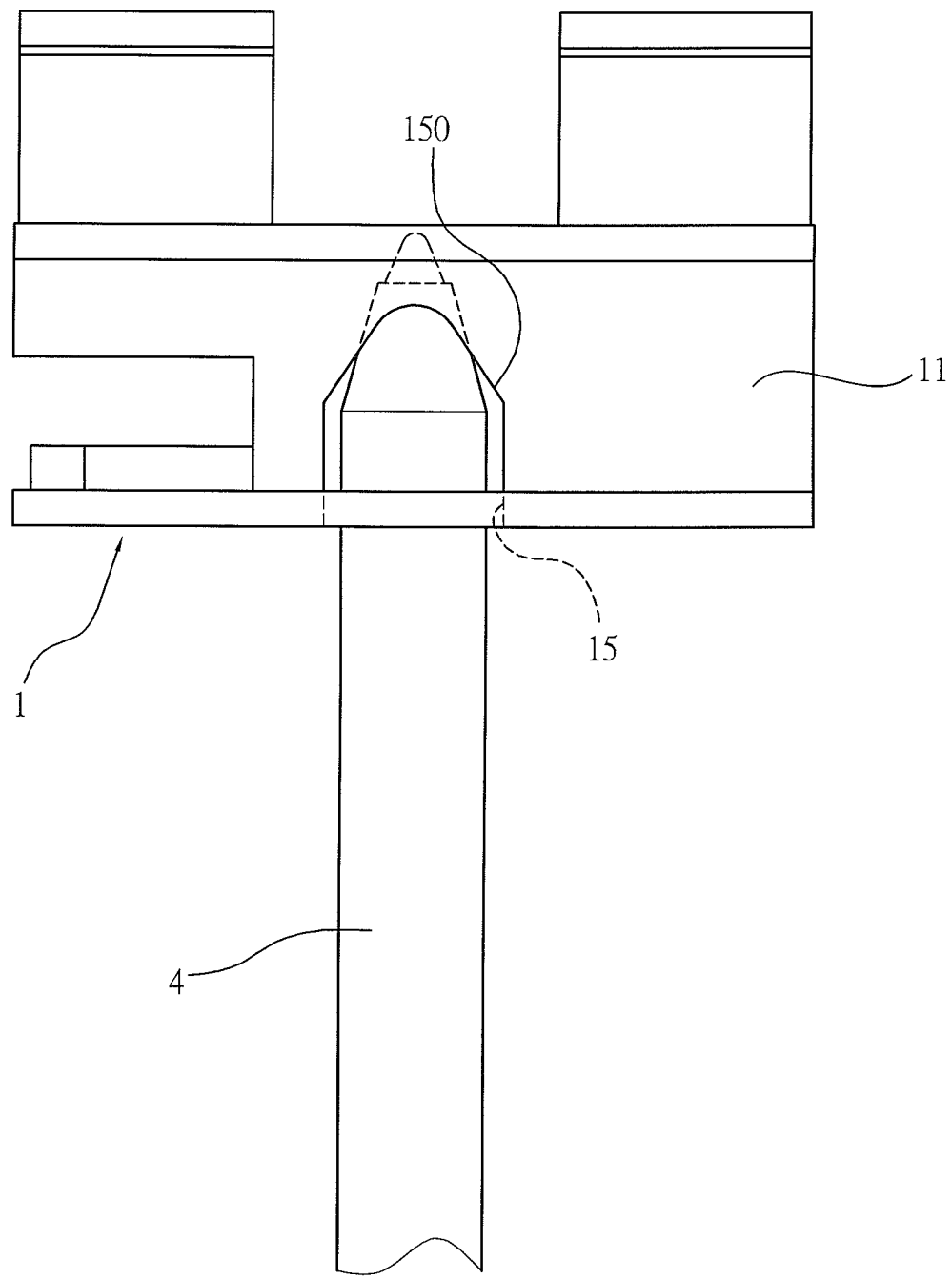
FIG. 8 is a partially top view of the cell phone charger holder in accordance with the preferred embodiment of the present invention.
Figure 9:
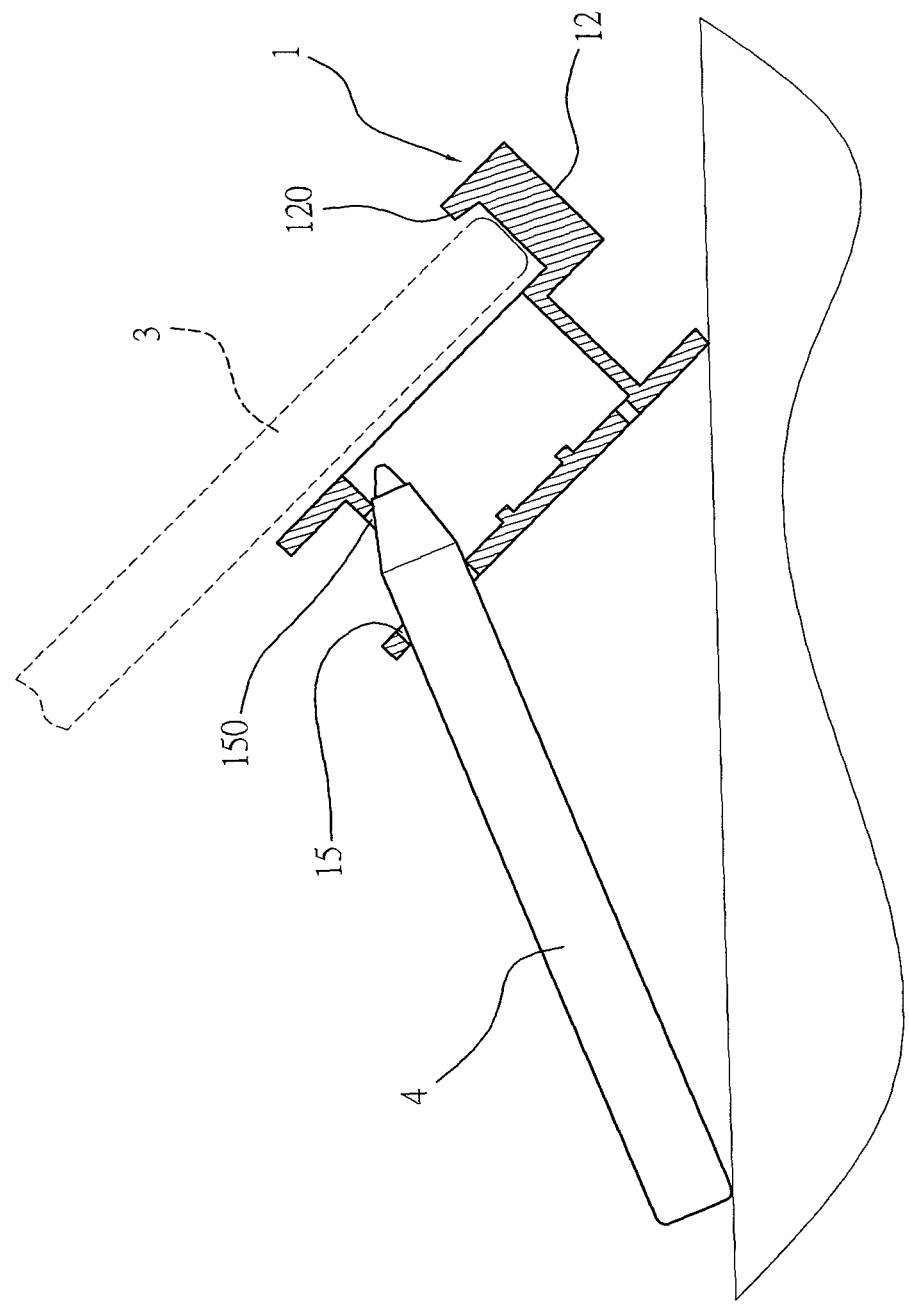
FIG. 9 is a side cross-sectional operational view of the cell phone charger holder as shown in FIG. 8.

Referring to FIGS. 8 and 9, when the charger is charged, the plug 21 cannot be used. At this time, the circular through hole 15 of the main body 1 is formed with a conical opening 150 extended into the annular groove 11. In such a manner, a cylindrical object, such as a pen 4, is inserted into the circular through hole 15 of the main body 1 and is locked in the conical opening 150 of the circular through hole 15, so that the pen 4 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the pen 4 is inclined to abut a surface (not labeled) so as to support the main body 1, so that the cell phone 3 is disposed at an inclined state to facilitate a user operating the cell phone 3, such as watching video films or pictures or exploring the internet.

Figure 10:
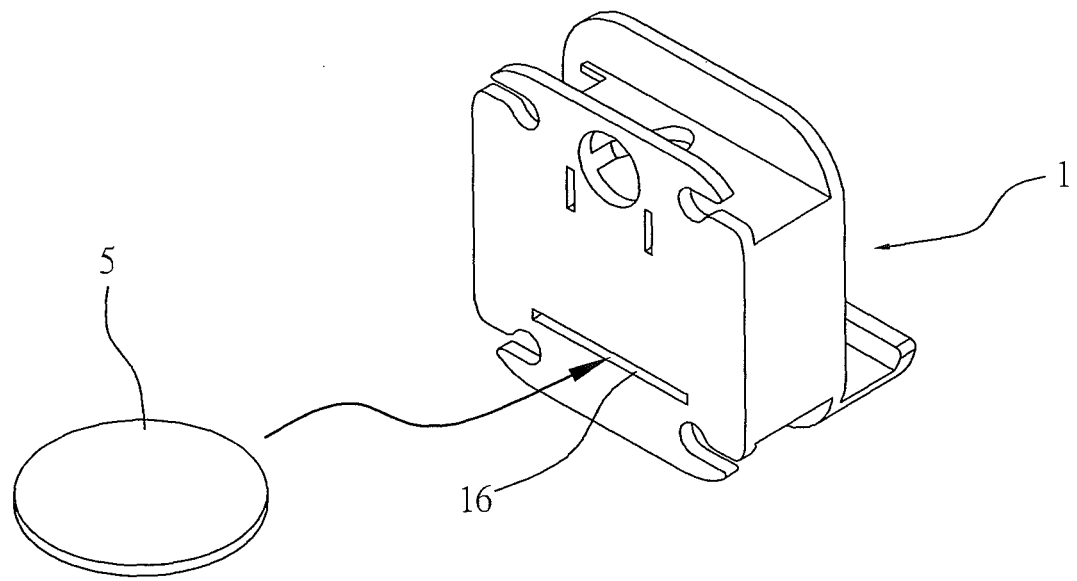
FIG. 10 is a perspective operational view of the cell phone charger holder as shown in FIG. 2.
Figure 11:
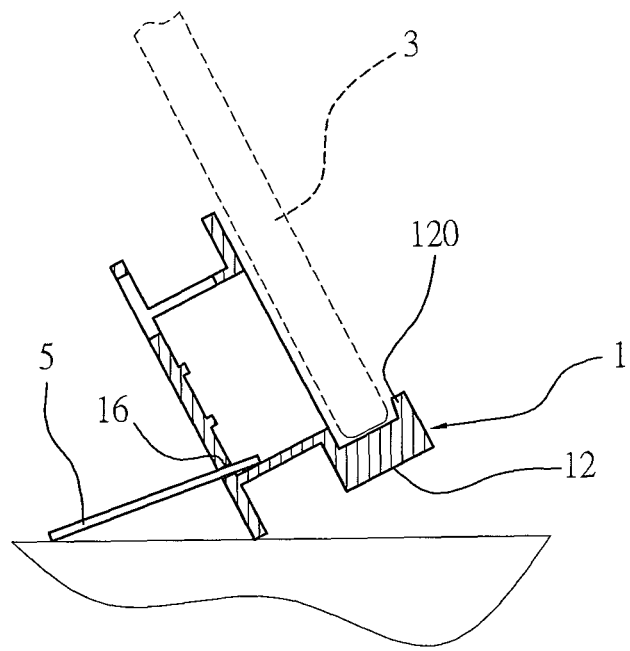
FIG. 11 is a side cross-sectional assembly operational view of the cell phone charger holder as shown in FIG. 10.

Referring to FIGS. 10 and 11, when the charger is charged, the plug 21 (not shown) cannot be used. At this time, a coin 5 is inserted into the elongate slot 16 of the main body 1 so that the coin 5 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the coin 5 is inclined to abut a surface (not labeled) so as to support the main body 1, so that the cell phone 3 is disposed at an inclined state to facilitate a user operating the cell phone 3, such as watching video films or pictures or exploring the internet.

Figure 12:
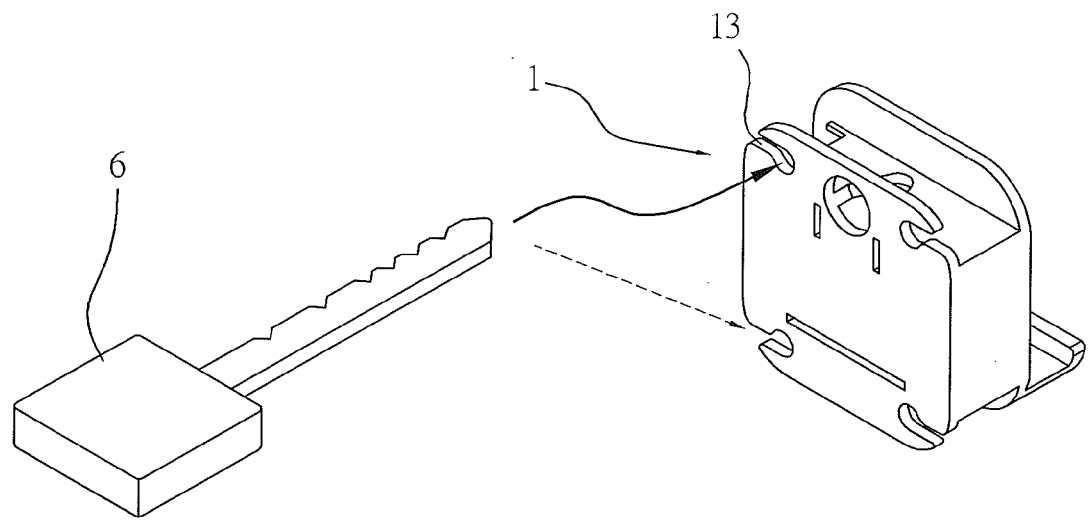
FIG. 12 is a perspective operational view of the cell phone charger holder as shown in FIG. 2.
Figure 13:
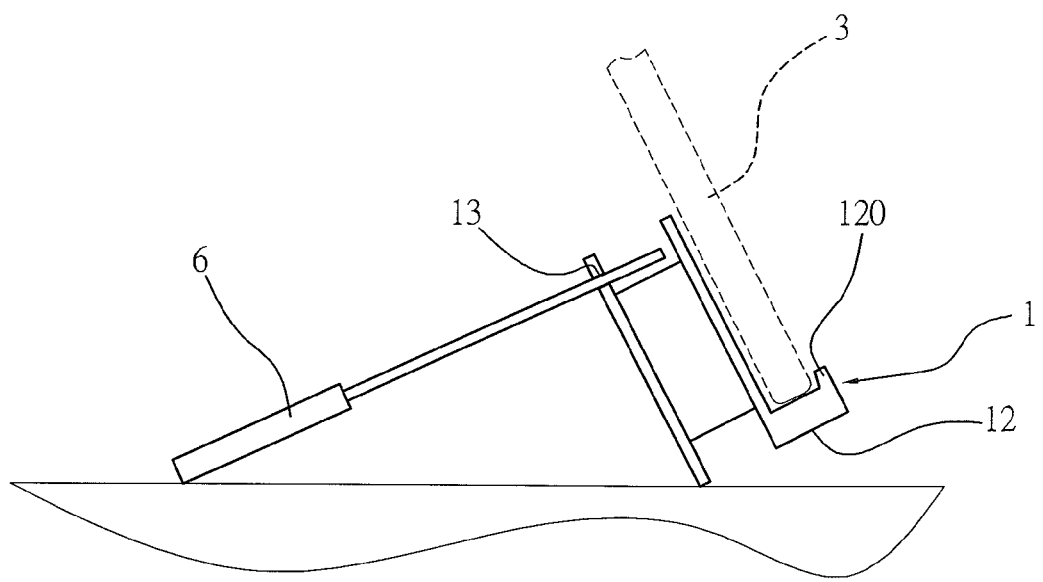
FIG. 13 is a side cross-sectional assembly operational view of the cell phone charger holder as shown in FIG. 12.

Referring to FIGS. 12 and 13, when the charger is charged, the plug 21 (not shown) cannot be used. At this time, a key 6 is inserted into any one of the clamping openings 13 of the main body 1 so that the key 6 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the key 6 is inclined to abut a surface (not labeled) so as to support the main body 1, so that the cell phone 3 is disposed at an inclined state to facilitate a user operating the cell phone 3, such as watching video films or pictures or exploring the internet.

Figure 14:
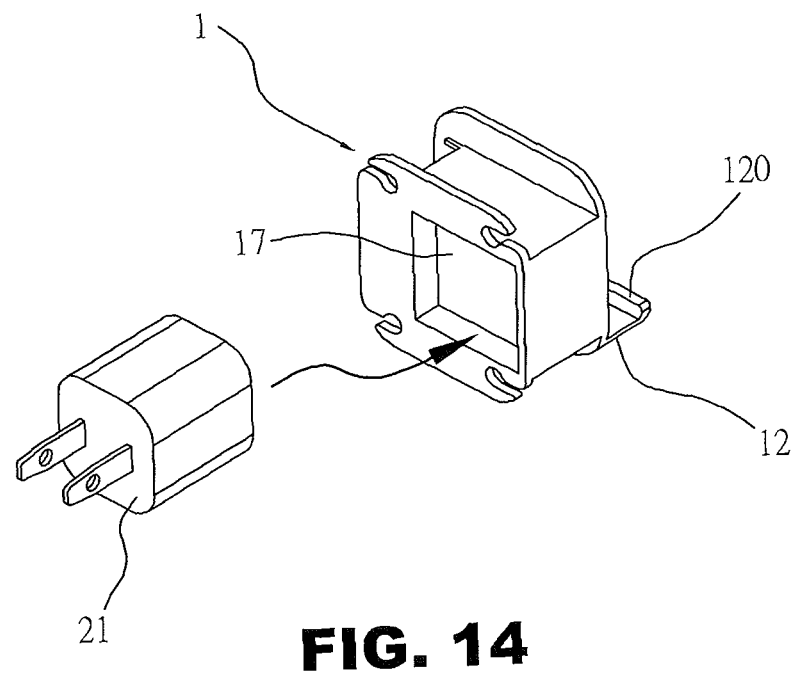
FIG. 14 is a partially exploded perspective view of a cell phone charger holder in accordance with another preferred embodiment of the present invention.
Figure 15:
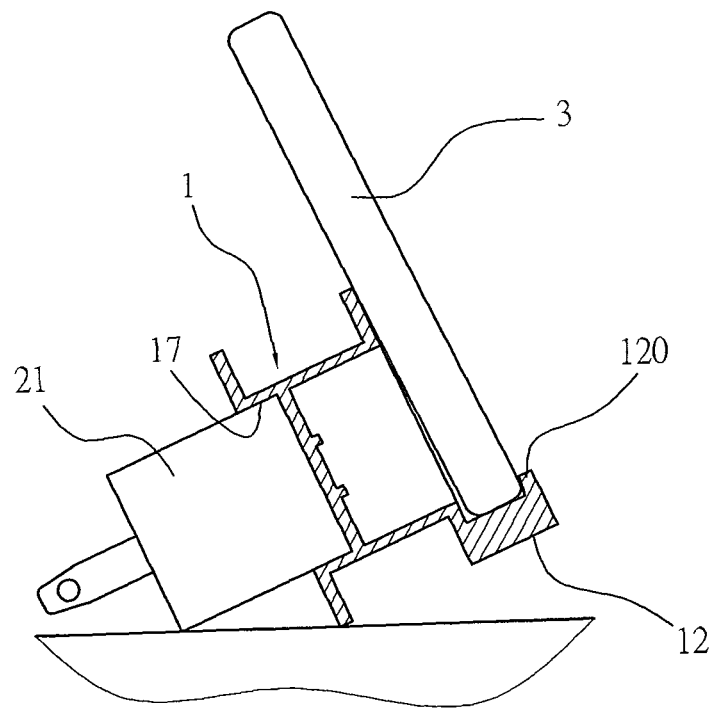
FIG. 15 is a side cross-sectional assembly operational view of the cell phone charger holder as shown in FIG. 14.

Referring to FIGS. 14 and 15, the back face of the main body 1 is provided with a receiving recess 17 corresponding to the bottom of the plug 21. In such a manner, the bottom of the plug 21 is inserted into the receiving recess 17 of the main body 1 so that the plug 21 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the plug 21 is inclined to abut a surface (not labeled) so as to support the main body 1, so that the cell phone 3 is disposed at an inclined state to facilitate a user operating the cell phone 3, such as watching video films or pictures or exploring the internet.

Figure 16:
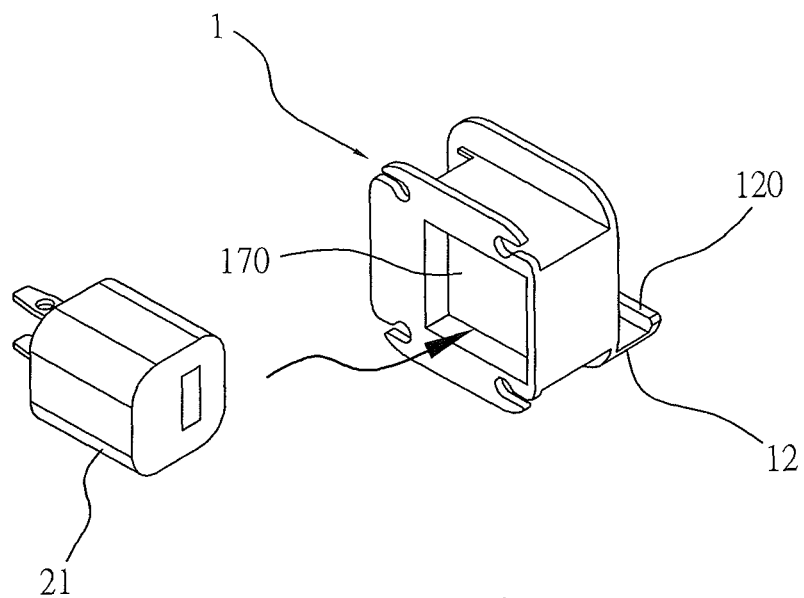
FIG. 16 is a partially exploded perspective view of a cell phone charger holder in accordance with another preferred embodiment of the present invention.
Figure 17:
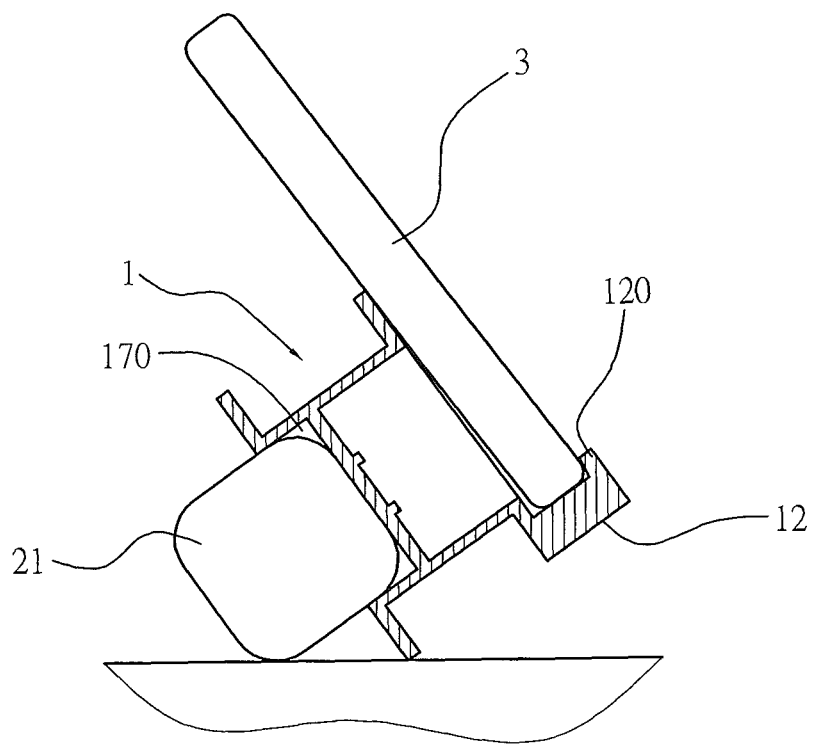
FIG. 17 is a side cross-sectional assembly operational view of the cell phone charger holder as shown in FIG. 16.

Referring to FIGS. 16 and 17, the back face of the main body 1 is provided with a receiving recess 170 corresponding to the side of the plug 21. In such a manner, the side of the plug 21 is inserted into the receiving recess 17 of the main body 1 so that the plug 21 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder. Then, the main body 1 is disposed at an inclined state, and the plug 21 is inclined to abut a surface (not labeled) so as to support the main body 1, so that the cell phone 3 is disposed at an inclined state to facilitate a user operating the cell phone 3, such as watching video films or pictures or exploring the internet.

Figure 18:
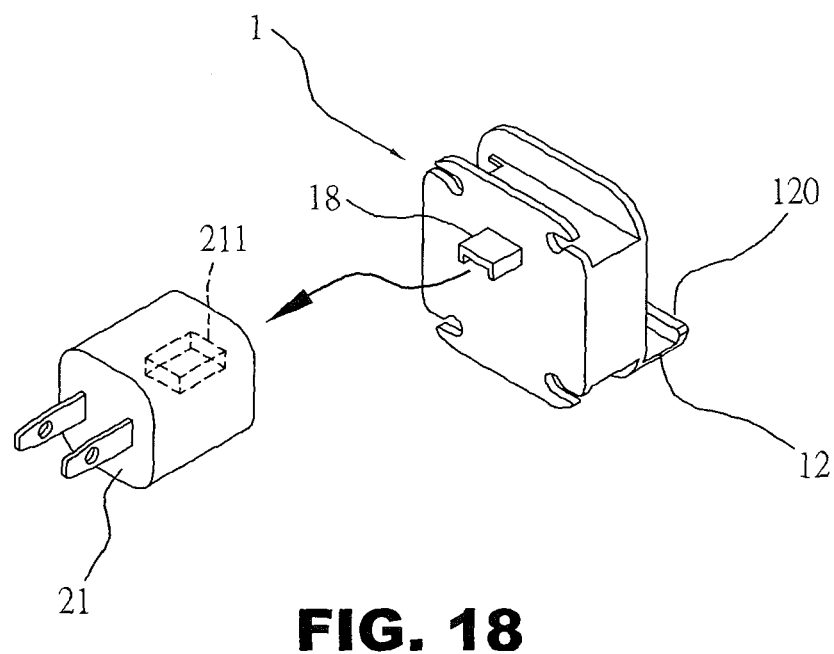
FIG. 18 is a partially exploded perspective view of a cell phone charger holder in accordance with another preferred embodiment of the present invention.
Figure 19:
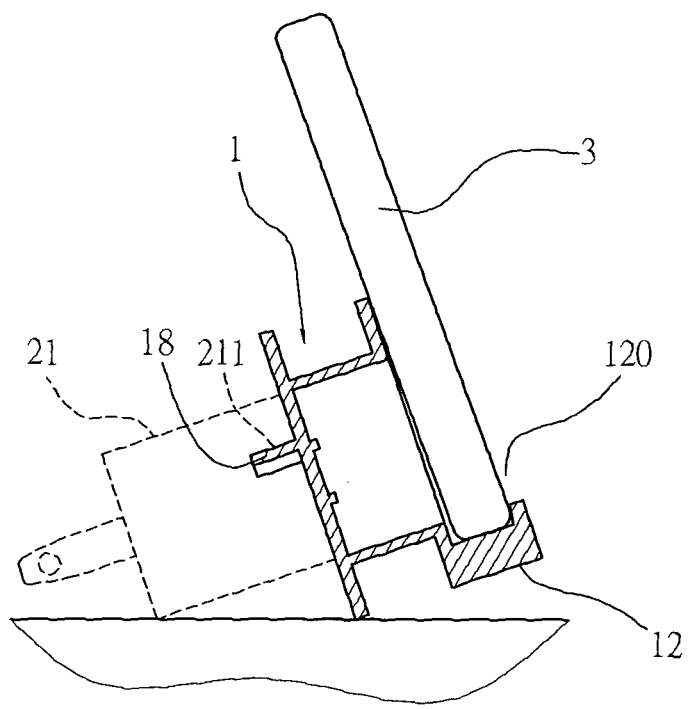
FIG. 19 is a side cross-sectional assembly operational view of the cell phone charger holder as shown in FIG. 18.

Referring to FIGS. 18 and 19, the bottom of the plug 21 is provided with a USB (universal serial bus) slot 211, and the back face of the main body 1 is provided with a projection 18 corresponding to the USB slot 211 of the plug 21. In such a manner, the USB slot 211 of the plug 21 is fitted onto the projection 18 of the main body 1 so that the plug 21 is attached to the main body 1. Then, the cell phone 3 is placed on the positioning hooks 12 of the main body 1 and is positioned by the stop plate 120 of each of the positioning hooks 12 so that the cell phone 3 is attached to the main body 1 of the holder.

Then, the main body 1 is disposed at an inclined state, and the plug 21 is inclined to abut a surface (not labeled) so as to support the main body 1, so that the cell phone 3 is disposed at an inclined state to facilitate a user operating the cell phone 3, such as watching video films or pictures or exploring the internet.

Accordingly, the plug 21 and the electric cord 22 are positioned and stored completely by the main body 1 of the holder so that the charger is stored easily and quickly to facilitate the user carrying and using the charger. In addition, when the main body 1 is disposed at an inclined state, the cell phone 3 supported by the main body 1 is disposed at an inclined state to facilitate the user operating the cell phone 3, such as watching video films or exploring the internet. Further, the main body 1 is supported by an ordinary item, such as a coin, an elongate article, a cylindrical object and the like, so that the main body 1 is disposed at an inclined state easily and quickly, thereby facilitating the user inclining the cell phone 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A cell phone charger holder comprising:
a main body, a plug, and an electric cord, wherein:
the plug is available for a charger of a cell phone and has two blades;
the electric cord is available for the charger of the cell phone;
the main body has a front face provided with a receiving chamber for receiving the plug;
the main body has a side provided with an annular groove for winding the electric cord;
the main body has a lower portion provided with two positioning hooks each protruding outward therefrom;
each of the positioning hooks of the main body is provided with a stop plate; and
the main body has a back face provided with two upright slots corresponding to the blades of the plug.

2. The cell phone charger holder of claim 1, wherein:
the main body is formed integrally;
the back face of the main body is provided with a plurality of arcuate clamping openings; and
the back face of the main body has an upper portion provided with a circular through hole and a lower portion provided with an elongate slot.

3. The cell phone charger holder of claim 2, wherein the back face of the main body has four chamfered corners each provided with the respective arcuate clamping openings.

4. The cell phone charger holder of claim 1, wherein the front face of the main body is provided with two slits for receiving the blades of the plug.

5. The cell phone charger holder of claim 1, wherein the back face of the main body is provided with a receiving recess for receiving a bottom or a side of the plug so that the main body is inclined by support of the plug.

6. The cell phone charger holder of claim 1, wherein the plug has a bottom provided with a USB slot, and the back face of the main body is provided with a projection corresponding to the USB slot of the plug so that the main body is inclined by support of the plug.

* * * * *